US009300625B1

(12) United States Patent
Potlapally et al.

(10) Patent No.: US 9,300,625 B1
(45) Date of Patent: Mar. 29, 2016

(54) NETWORK ADDRESS VERIFICATION

(71) Applicant: Amazon Technologies, Inc., Reno, NV (US)

(72) Inventors: Nachiketh Rao Potlapally, Arlington, VA (US); Eric Jason Brandwine, Haymarket, VA (US); Patrick Brigham Cullen, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 406 days.

(21) Appl. No.: 13/733,019

(22) Filed: Jan. 2, 2013

(51) Int. Cl.
*H04L 29/12* (2006.01)
*H04L 29/06* (2006.01)

(52) U.S. Cl.
CPC ............ *H04L 61/2007* (2013.01); *H04L 63/04* (2013.01); *H04L 63/12* (2013.01)

(58) Field of Classification Search
CPC ... H04L 63/08; H04L 63/10; H04L 29/12066; H04L 67/20; H04L 61/2007; H04L 63/04; H04L 63/12; G06F 21/6218
USPC .......................................... 709/223, 224, 245
See application file for complete search history.

(56) References Cited

U.S. PATENT DOCUMENTS

| | | | |
|---|---|---|---|
| 6,836,765 B1* | 12/2004 | Sussman ..................... 705/75 |
| 7,483,393 B2* | 1/2009 | Wing ............... H04L 29/12009 370/254 |
| 8,370,168 B1* | 2/2013 | Jenkins et al. ................ 705/1.1 |
| 8,577,998 B2* | 11/2013 | Ver Steeg et al. ............. 709/220 |
| 8,667,514 B2* | 3/2014 | Rastogi et al. ............... 719/328 |
| 8,761,167 B2* | 6/2014 | Baptist et al. ................ 370/389 |
| 8,892,873 B1* | 11/2014 | Souza et al. .................. 713/162 |
| 9,148,401 B2* | 9/2015 | Shen ............... H04L 29/12915 |
| 2002/0007411 A1* | 1/2002 | Shaked et al. ................ 709/229 |
| 2003/0056094 A1* | 3/2003 | Huitema et al. .............. 713/157 |
| 2004/0008845 A1* | 1/2004 | Le et al. ........................ 380/277 |
| 2006/0248600 A1* | 11/2006 | O'Neill .......................... 726/29 |
| 2006/0281442 A1* | 12/2006 | Lee et al. .................... 455/412.2 |
| 2007/0220605 A1* | 9/2007 | Chien ............................ 726/23 |
| 2008/0240099 A1* | 10/2008 | Wasielewski ................ 370/392 |
| 2009/0089409 A1* | 4/2009 | Pasko et al. .................. 709/223 |
| 2011/0145580 A1* | 6/2011 | Auradkar et al. ............. 713/170 |
| 2014/0258378 A1* | 9/2014 | Cobb ............................ 709/203 |
| 2015/0142973 A1* | 5/2015 | Robitaille ........... H04L 61/2007 709/224 |

\* cited by examiner

*Primary Examiner* — Lashonda Jacobs
(74) *Attorney, Agent, or Firm* — Kilpatrick Townsend & Stockton LLP

(57) ABSTRACT

Data payloads that may not be accessible to customer computing devices may be utilized to verify network address ownership. In some examples, a first payload may be provided to a computing device having an address. Additionally, a second payload may be received from the computing device. Based at least in part on a relationship between the first payload and the second payload, an action associated with the address may be performed.

30 Claims, 7 Drawing Sheets

NETWORK ADDRESS VERIFICATION

BACKGROUND

Distributed computing systems as well as distributed computing services have become widely available in recent years. Such services and/or systems may, in some cases, be geographically and/or logically separate from one or more clients or users subscribing to the services. These services may include one or more computing devices configured to act as machine instances (e.g., virtual processors) and/or storage resources (e.g., virtual disk drives), for example. To access such services, clients may provide network addresses indicating computing devices where secure and/or private data is to be transmitted. The computing devices may be client or user computing devices. However, managing and/or verifying these network addresses may pose challenges to the service providers as well as the clients.

BRIEF DESCRIPTION OF THE DRAWINGS

Various embodiments in accordance with the present disclosure will be described with reference to the drawings, in which.

DETAILED DESCRIPTION

Figure 1:
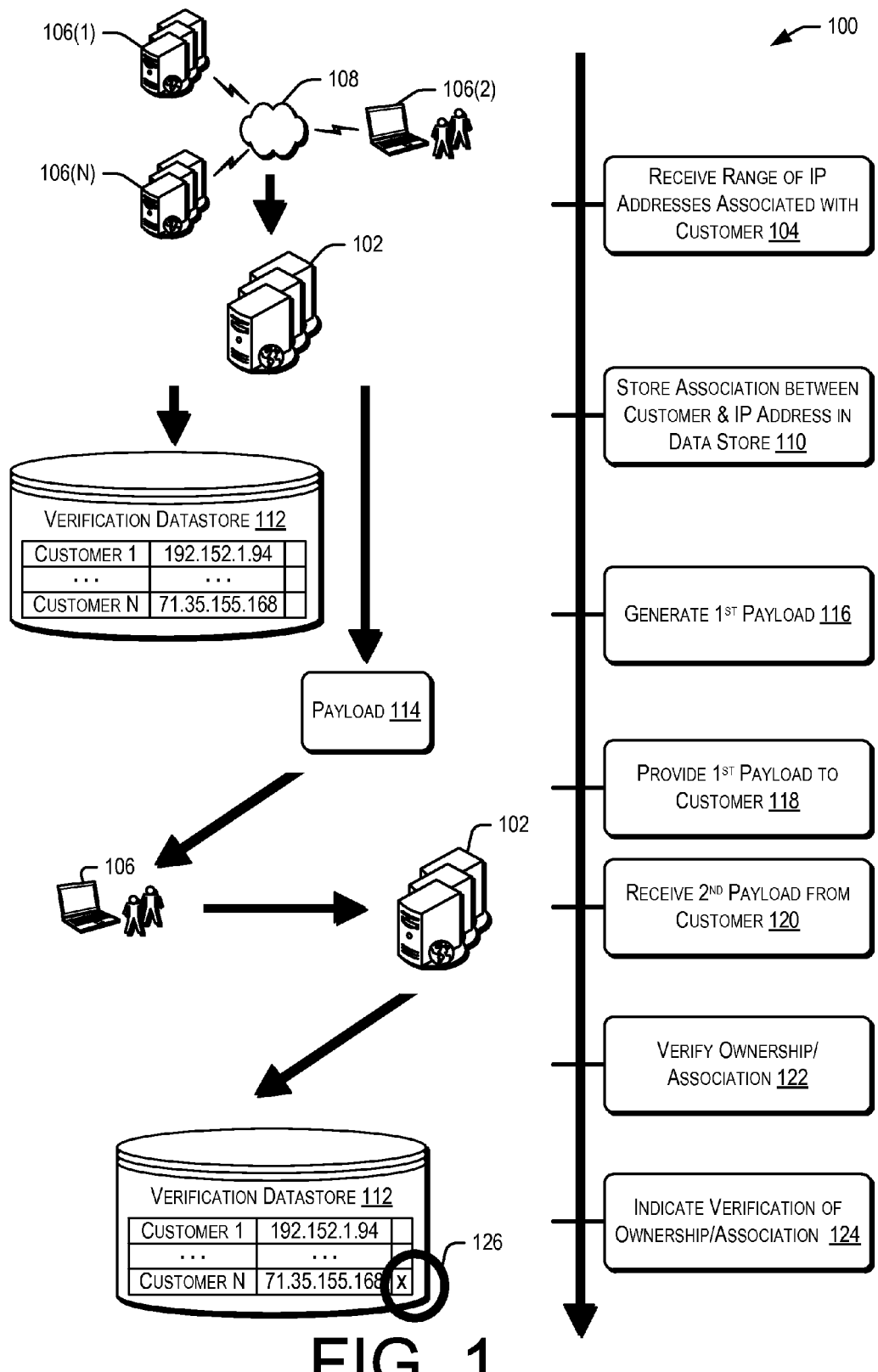
FIG. 1 illustrates an example flow for implementing network address verification, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing client network addresses and/or associations between clients and their network addresses. Additionally, the present disclosure may be directed to verifying or certifying that network addresses allegedly owned by or otherwise identifying resources of a client actually belong to those clients. In some examples, a service provider that offers distributed computing resources (e.g., an Infrastructure-as-a-Service (IaaS) provider, a cloud provider, etc.) may allow a customer's network resources to be connected therewith. In other words, a customer may connect their private network resources to the service provider's host computing devices via communication links (e.g., via dedicated, high-speed links or the like). For example, in at least this context, connecting the customer's resources with service provider devices may include, but is not limited to, enabling communications between the two systems (e.g., in a way that was not previously enabled), reconfiguring firewall settings, routing data to particular ports (e.g., secured ports, etc.), or the like.

Thus, in some examples, a client or customer may provide one or more network addresses (e.g., in a set, a list, a range, or other grouping) that identify computing devices of the client, customer, or of an account or private network. In some aspects, the client or customer may be logged in or otherwise authenticated prior to providing the network addresses. As such, the service provider may attempt to verify ownership of the network addresses prior to transmitting client-specific, proprietary, or other private information to such addresses. As used herein, a network address may include any address that may identify a computing device accessible via a network (e.g., the Internet, a virtual private network, etc.) and/or indicate a location of any such device including, but not limited to, Internet Protocol (IP) addresses or the like. Once ownership of the network addresses is verified, the service provider may then provide service-specific, user-specific, and/or account specific data to the computing devices identified by the verified network addresses. In this way, only computing devices with verified IP addresses may be able to connect to the service provider resources.

In some examples, web service users or, in general, clients may utilize or otherwise control a processing entity of the service provider to control, access, or otherwise manage other computing resources. As such, data associated with the processing entity and/or the computing resources of the service provider may be communicated with computing resources of a client's private network via the verified connections discussed above. As used herein, a processing entity may be a computing resource of the service provider and may include one or more computing devices, such as instantiated virtual machine instances, configured to access data of the distributed computing system (e.g., provided by the distributed system and acting on behalf of a client or user of the system). In some aspects, the service provider may also provide storage, access, and/or placement of one or more computing resources through a service such as, but not limited to, a web service, a cloud computing service, or other network based data management service. For example, a user or processing entity acting on behalf of the user may access, via the service provider, data storage services and/or data management services such that access mechanisms may be implemented and/or provided by the service provider to the processing entity utilizing the computing resources. In some examples, computing resource services, such as those provided by the service provider, may include one or more computing resources accessible across one or more networks through user interfaces (UIs), application programming interfaces (APIs), and/or other interfaces where the one or more computing resources may be scalable and/or expandable as desired.

In some examples, the computing resources may be server computer systems and/or data storage computer systems in a distributed computing environment, although other computing resources are considered as being within the scope of the present disclosure, some examples of which are provided below. Additionally, embodiments of the present disclosure may also be directed to, among other things, providing data associated with the operation and/or other aspects of the resources described herein, as well as managing network address verification in order to securely provide such data. Once verified, the network addresses may be utilized to route appropriate data to appropriate computing devices. For example, a verification of an association between a computing device and its network address may be indicated in a table, chart, or other data structure for managing such verifications. The service provider may then reference the association map to determine whether a network address-device pair has been verified prior to connected that device and/or prior to providing information to that device.

FIG. 1 depicts an illustrative flow 100 in which techniques for the verification of network addresses may be implemented. These techniques are described in more detail below in connection with at least FIGS. 2-7. Returning to FIG. 1, in illustrative flow 100, operations may be performed by one or more processors of one or more service provider computers 102 potentially located in different geographic locations. Additionally, instructions for performing the operations may be stored in one or more memories of the service provider computers 102. As desired, the flow 100 may begin at 104, where the service provider computers 102 may receive a range of IP addresses associated with one or more client devices 106(1)-(N) (collectively, "client devices 106") of a private network 108. In some examples, the client devices 106 may be customer devices or devices of a particular client account. Additionally, the client devices 106 may in communication with one another as part of the private network 108 in such a way that data stored within the client devices 106 is secure from unauthorized access outside of the private network 108. Additionally, each client device 106 and/or another device (e.g., a router or network interface) of the private network 108 may be identified by a network address, such as an IP address. As such, at 104, the range of IP addresses may be based at least in part on IP addresses of the client devices 106. Additionally, in some examples, the client devices 106 (or a user of the client devices 106) may log in or otherwise authenticate themselves with the service provider computers 102 prior to the reception of the IP addresses (or the range of IP addresses).

At 110 of the flow 100, the service provider computers 102 may store information about customers, accounts, and/or network addresses. For example, the service provider computers 102 may store associations between a customer, an account, and/or a computing device of the customer or account as well as each respective IP address. These associations may, in some examples, be stored in a verification data store 112 or other such storage device. For example, the verification data store 112 may store device-address pairs, account-address pairs, and/or customer-address pairs. Additionally, the verification data store 112 may include information that identifies a customer, client, and/or account and each device associated therewith. For each device, there may be a single network address; however, each customer and/or account may be associated with multiple devices. As such, in some examples a lookup table or other data structure may include reference to a list of devices (with associated IP addresses in some cases) for each customer and/or account. In some examples, a lookup table or other storage structure may include an association between a customer and each of its computing devices, each computing device may also be identified by a network address (e.g., an IP address).

Additionally, the service provider computers 102 may generate a first payload 114 at 116 of the flow 100. The first payload may be a randomly generated number, a pseudo-randomly generated number, or any other information (e.g., a string of alphanumeric characters, symbols, numbers, etc.) that is not known by others outside of the service provider computers 102. As such, the first payload may be utilized to verify or otherwise determine the accuracy of the IP addresses received from the client devices 106 at 104. At 118, the service provider computers 102 may provide the first payload 114 to one or more of the client devices 106. A determination as to which client devices 106 to provide the first payload may be made based at least in part on the received IP address and/or a list of client devices in the verification data store 112. For example, the first payload may be provided to a client device identified by one of the received IP addresses and/or to a client device listed in the data store 112 (e.g., received in an earlier transaction or otherwise already known, but not verified). Additionally, as noted, the first payload may be a random number or it may be any information that the client devices 106 do not have access to prior to first payload being provided at 118. Further, in some examples, the first payload may be provided to a subset of received IP addresses. As such, the service provider computers 102 may transmit information to the customer or account that identifies which IP address were used and/or to which computing devices the first payload was provided.

At 120 of flow 100, the service provider computers 102 may receive a second payload from the client devices 106. In some aspects the second payload may be a retransmission of the first payload or a copy of the first payload. However, in other aspects, the second payload may be information derived or otherwise associated with the first payload including, but not limited to, a hash of the first payload, a portion of the first payload, or some other transformation of the first payload. In this way, the client devices 106 may provide the second payload back to the service provider computers in order to be utilized for verification or certification that the account or customer owns the IP addresses they claimed to own (i.e., the IP addresses received at 104) or that the association between device (or account) and IP address is accurate. As such, the service provider computers 102, at 122 of flow 100, may verify the asserted IP address ownership and/or verify the association stored in the verification data store 112. In some aspects, verification may be performed by comparing the first payload (or a portion or transformation thereof) with the second payload (or a portion of transformation thereof). For example, the service provider computers 102 and the client devices 106 may both calculate a hash (e.g., based at least in part on the hash function) of the first payload. The second payload may then, in fact, be a hash of the first payload. In this example, if the received second payload (i.e., a hash of the first payload) corresponds to (e.g., matches) the hash of the first payload (e.g., calculated by the service provider computers 102), this may indicate that the IP address has been verified. As such, when either the IP ownership or the stored association is verified, a direct connection may be made between the service provider computers 102 and the client devices 106 identified by the verified IP addresses. Additionally, in some examples, once the verification is complete, the service provider computers may indicate verification of ownership and/or the association at 124 of flow 100. For example, the service provider computers 102 may mark 126 a column in a table of the data store 112 or otherwise indicate that the association has been validated and/or that the ownership has been verified. Once the indication has been made, the service provider computers 102 may reference the table or other information in the data store 112 to determine to which IP addresses to connect and/or with which computing devices to provide private, customer-specific, and/or sensitive information.

Additionally, in some examples, distributed state tracking methods may be employed to enable additional methods of verifying IP address ownership. For example, metadata associated with the payload or the payload data sent in a packet may include an algorithm for choosing the data in the packet to be utilized for verification. In some cases, the algorithm may instruct the user devices 106 to concatenate portions of the payload (e.g., the destination IP, the date, the customer identifier (ID), etc.) and/or to perform authentication methods (e.g., a hash-based message authentication code (HMAC) or the like) to the payload. The service provider computers 102 may also perform this algorithm on the first data payload prior to sending it. In this way, the service provider computers 102 may not need to record the provided payload. When the user devices 106 provide the second payload to verify ownership the tested IP address, the service provider computers 102 may be configured to look up the customer ID, the IP address, and/or the date, recreate the whole string (based at least in part on the algorithm), perform the HMAC authentication, and compare the payloads (i.e., to verify ownership) without utilizing the data store 112 for storing of all the verification payloads that have been sent.

Figure 2:
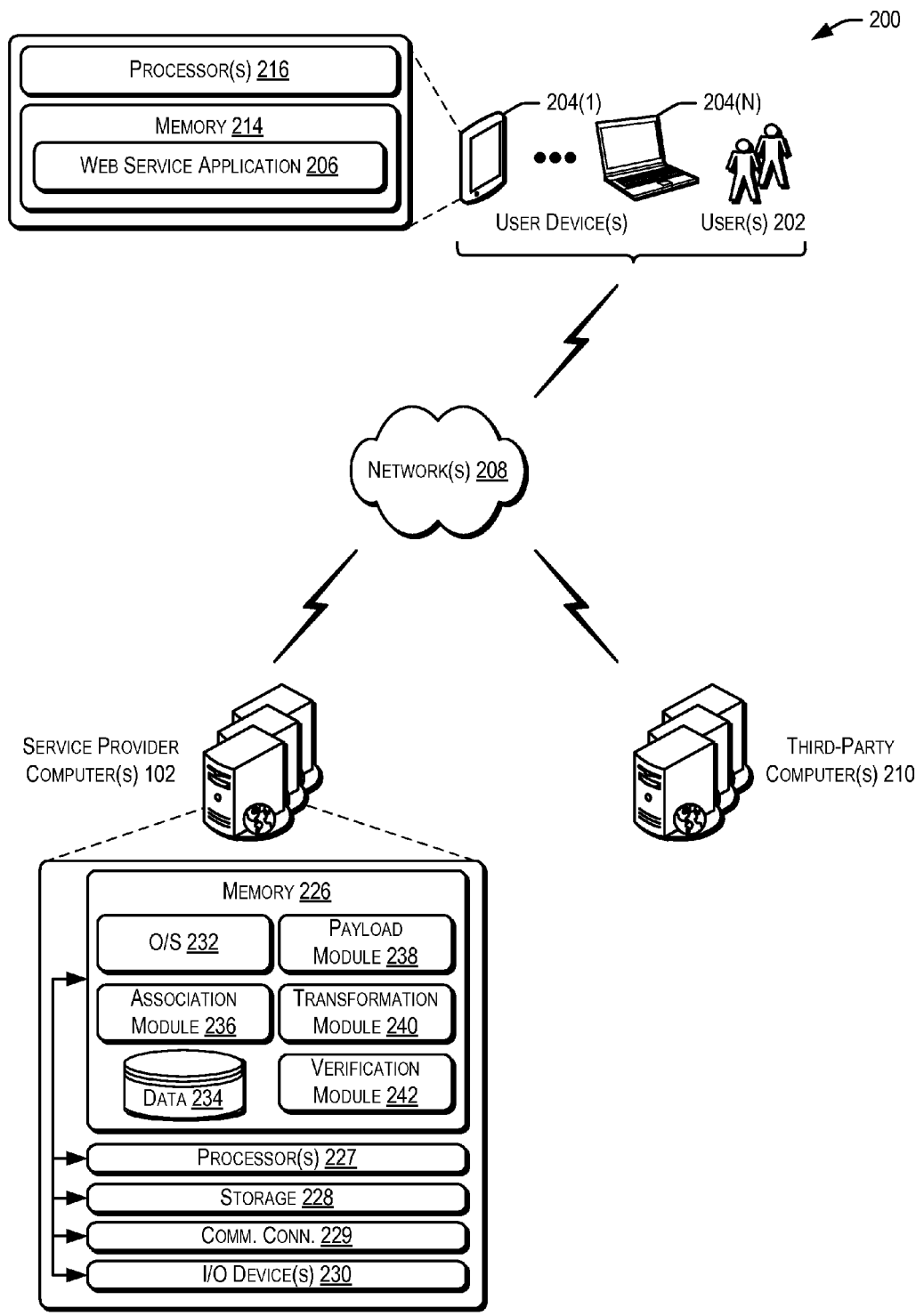
FIG. 2 illustrates an example architecture for implementing the network address verification described herein that includes a service provider computer, one or more user devices, one or more third-party computing devices, and/or one or more potential hacker computers connected via one or more networks, according to at least one example.

FIG. 2 depicts an illustrative system or architecture 200 in which techniques for the verification of network addresses may be implemented. In architecture 200, one or more users 202 (i.e., account holders or web browser users) may utilize user computing devices 204(1)-(N) (collectively, "user devices 204") to access an application 206 (e.g., a web service application, a web browser, etc.), a user account accessible through the application 206 via one or more networks 208. In some aspects, the application 206 and/or user account may be hosted, managed, and/or provided by a computing resources service or service provider, such as by utilizing one or more service provider computers 102 that may be located in one or more different physical and/or geographic locations (e.g., on different racks, within different facilities, at different addresses, in different cities, in different countries, etc.). Additionally, one or more third-party computers 210 may also have access to the networks 208. The one or more service provider computers 102 may, in some examples, provide computing resources such as, but not limited to, client entities, low latency data storage, durable data storage, data access, management, virtualization, cloud-based software solutions, point of interest information management, etc. In some aspects, a client entity may be deployed and/or managed virtually and/or data volumes may be stored virtually within a distributed computing system operated by the one or more service provider computers 102. The one or more service provider computers 102 may also be operable to provide web hosting, computer application development, and/or implementation platforms, combinations of the foregoing, or the like to the one or more users 202. The one or more service provider computers 102, in some examples, may provide verification of IP address, other network addresses, and/or customers, users, etc. Additionally, in some examples, the service provider computers 102 may also provide a secure way to reset an account or otherwise gain access to secure information.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the service provider computers 102 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with the service provider computers 102, such as to access web content (e.g., web pages, music, video, etc.) and/or web service resource operational information (e.g., web traffic data, web service purchase information, etc.). The one or more service provider computers 102, perhaps arranged in a cluster of servers or as a server farm, may host the application 206 and/or cloud-based software services. Other server architectures may also be used to host the application 206 and/or cloud-based software services. The application 206 may be capable of handling requests from many users 202 and serving, in response, various user interfaces that can be rendered at the user devices 204 such as, but not limited to, web content and/or operational information. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

As noted above, the architecture 200 may include one or more user devices 204. The user devices 204 may be any type of computing device such as, but not limited to, a mobile phone, a smart phone, a personal digital assistant (PDA), a laptop computer, a desktop computer, a thin-client device, a tablet PC, etc. In some examples, the user devices 204 may be in communication with the service provider computers 102 via the networks 208, or via other network connections.

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein via the application 206 (e.g. a web browser) or dedicated applications (e.g., smart phone applications, tablet applications, etc.). Additionally, the memory 214 may store access credentials and/or other user information such as, but not limited to, an IP address, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the service provider computers 102 may also be any type of computing devices such as, but not limited to, mobile, desktop, thin-client and/or cloud computing devices, such as servers. In some examples, the service provider computers 102 may be in communication with the user devices 204 and/or other service providers via the networks 208, or via other network connections. The service provider computers 102 may include one or more servers, perhaps arranged in a cluster, as a server farm, or as individual servers not associated with one another. These servers may be configured to perform the verification of network address ownership as part of an integrated, distributed computing environment.

In one illustrative configuration, the service provider computers 102 may include at least one memory 226 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The memory 226 may store program instructions that are loadable and executable on the processor(s) 227, as well as data generated during the execution of these programs. Depending on the configuration and type of service provider computers 102, the memory 226 may be volatile (such as RAM) and/or non-volatile (such as ROM, flash memory, etc.). The service provider computers 102 or servers may also include additional storage 228, which may include removable storage and/or non-removable storage. The additional storage 228 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 226 may include multiple different types of memory, such as SRAM, DRAM, or ROM.

The memory 226, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 226 and the additional storage 228 are all examples of computer storage media. Additional types of computer storage media that may be present in the service provider computers 102 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 102 may also contain communications connection(s) 229 that allow the service provider computers 102 to communicate with a stored database, another computing device or server, user terminals and/or other devices on the networks 208. The service provider computers 102 may also include I/O device(s) 230, such as a keyboard, a mouse, a pen, a voice input device, a touch input device, a display, speakers, a printer, etc.

Turning to the contents of the memory 226 in more detail, the memory 226 may include an operating system 232, one or more data stores 234, and/or one or more application programs or services for implementing the features disclosed herein including an association module 236, a payload module 238, a transformation module 240, and/or a verification module 242. In some examples, the association module 236 may be configured to associate one or more computing devices such as, but not limited to, user devices 204 with respective network address (e.g., IP addresses or the like). Additionally, the association module 236 may also associate a list or range of IP addresses with a particular customer and/or account. The associations may be stored in the data store 234 for reference, updating, and/or indicating whether ownership has been verified. In some examples, the payload module 238 may be configured to generate a first payload to be provided to each user device 204 (or a subset of user devices 204) to be verified. In some aspects, a customer may provide a range of IP addresses which belong to the customer. The IP addresses may be provided through a secure channel including, but not limited to, a personal courier, a public key infrastructure (PKI) signed and encrypted email, an authenticated telephone call or text message, etc.

As noted above, once a user provides a network address, indicating that they own, manage, or control the computing device identified by the network address, the payload module 238 may be utilized by the service provider computers 102 to generate a random number, pseudo-random number, or other information for verification purposes. In some aspects, the payload module 238 may also be configured to provide the payload to the user devices 204 upon a request or determination to verify that device. The payload me be provided from a single location (e.g., from a single or multiple service provider computers 102 located at the same location) or it may be provided from multiple different locations (e.g., from a first computer of the service provider computers 102 located in a first geographic location and from a second computer of the service provider computers 102 located in a second geographic location). However, in some examples, the payload may be provided to the third-party computers 210 for transmission to the user devices 204. In this way, the routing of the payload may be managed or otherwise controlled by a third party, thus adding a level of trust to the verification transaction. In other words, the users 202 and/or other interested parties may be more willing to trust the results of the verification process if it not completely controlled by the service provider computers 102. As such, the third-party computers 210 may be given the payload and one or more IP addresses, and may be left alone regarding how to provide this information to the user devices 204.

In some examples, transformation module 240 may be configured to transform the payload at least for security. For example, the service provider computers 102 may utilize the transformation module 240 to generate a hash or other cryptographic transformation on the first data payload. In some aspects, the transformation function performed on the payload may be shared with the user devices 204 such that the user devices 204 may utilize the same transformation function on the received payload. In this way, when the user device 204 provides the second payload (or stated differently, when the user device 204 provides the payload back) to the service provider computers 102, they can be compared for accuracy. If the user device 204 owns the IP address that they indicated they own, they will be able to provide the correct payload whether a transformation function was utilized or not. As such, the raw payloads may be utilized for verification, without any transformation being performed. Further, in some aspects, utilizing the payload module 238 and the transformation module 240, the service provider computers 102 may formulate specially crafted packets with random information in the payload. Additionally, a cryptographic hash of the random information may be generated. The service provider computers 102 may then send these packets to one or more IP addresses provided by the user computers 204. In the event of a large range of IP addresses, however, the service provider computers 102 may select (e.g., at random) a subset of the IP addresses and send the specially crafted packets to those selected addresses. In this example, the service provider computers 102 may also inform the user computers 204 of the selected IP addresses so the associated computing devices will know to listen for the packets.

In some aspects, the user devices 204 may be configured to receive or otherwise collect the packets sent by the service provider computers 102, compute a transformation (e.g., a cryptographic has or the like) of the data contained within the packets, and send the transformed data back to the service provider computers 102. The user devices 204 may, in some examples, collect the packets at the end hosts and/or set up a filter for the packets on an upstream router in their network. Given the packet routing infrastructure on the Internet, the user devices 204 should not receive these specially crafted packets unless they actually own the respective IP addresses. Additionally, in some aspects, the verification module 242 may be configured to compare the received payload (e.g., the transformed payload from the user devices 204) with provided payload (e.g., the data transformed by the service provider computers 102). In some examples, agreement between these values may prove authenticity of the customer's claims of ownership of the IP addresses. Further, in some examples, the service provider computers 102 repeat the verification process with different payloads (e.g., different random numbers) and/or from different locations in the Internet. For example, utilizing the third-party computers 210. In some cases, this may aid in ensuring that the verification process is not dependent exclusively on the infrastructure of the service provider computers 102. This may leverage the trust inherent in the Internet's routing mechanisms. Additionally, this distributed verification may be helpful in resolving disputes about the results of the verification process. In the case of a successful comparison of transformed values based at least in part on providing the payloads from multiple locations on the Internet, the service provider computers 102 may be able to certify the authenticity of claims of IP address ownership and facilitate connecting these IP addresses to the customer's hosts in the cloud (i.e., with the service provider computers 102). The verification process may also be repeated at intervals to ensure that the customers continue to own the IP addresses.

Additionally, in some examples, the verification process could be an add-on service provided to customers to enable higher levels of security. For example, when a user is locked out of an account, the verification process described above, at least utilizing one or more of the modules 236, 238, 240, 242 of the service provider computers 102, may be utilized to allow access to the locked account, allow resetting the locked account, allow access to a stored password, etc. In some examples, it may be possible to have a verified IP address of an enterprise environment (or other such account system), where an administrator generally has access to the log-in and/or password information associated with the environment. By utilizing the verification process over an already verified IP address, the service provider computers 102 may be configured to verify the user. For example, the payload may be provided to the user over a secure channel (e.g., to a verified IP address of a private network), and the user may then return the payload as evidence that they received it. In some examples, this functionality may be enabled by the fact that if a router within a private network is secure, the receipt of the payload is likely secure. As such, if the IP address is already verified, and the private network where that verified IP address resides is known to be secure, the service provider computers 102 may be able to give access to such account managers or administrators even when they are otherwise locked out of the account. The account managers or administrators may then be able to reset the account, reset passwords and/or user names, and/or request secure information. Additionally, configuration settings may be configurable by the users 202 or other customers to enable or disable such verification functionality, determine which channels should be utilized for providing the payloads, determine when or how passwords are to be reset, and/or enable the users or customers to fully customize any feature of the system described herein. Further, users 202 may request to be verified or to have IP addresses verified. Alternatively, or in addition, the verification process may be automated and/or initiated based at least in part on settings and/or triggers (e.g., time since the last verification, a number of new IP addresses received, etc.).

A few additional examples of the operations of the service provider computers 102 are also described in greater detail below with reference to FIGS. 3-7.

Figure 3:
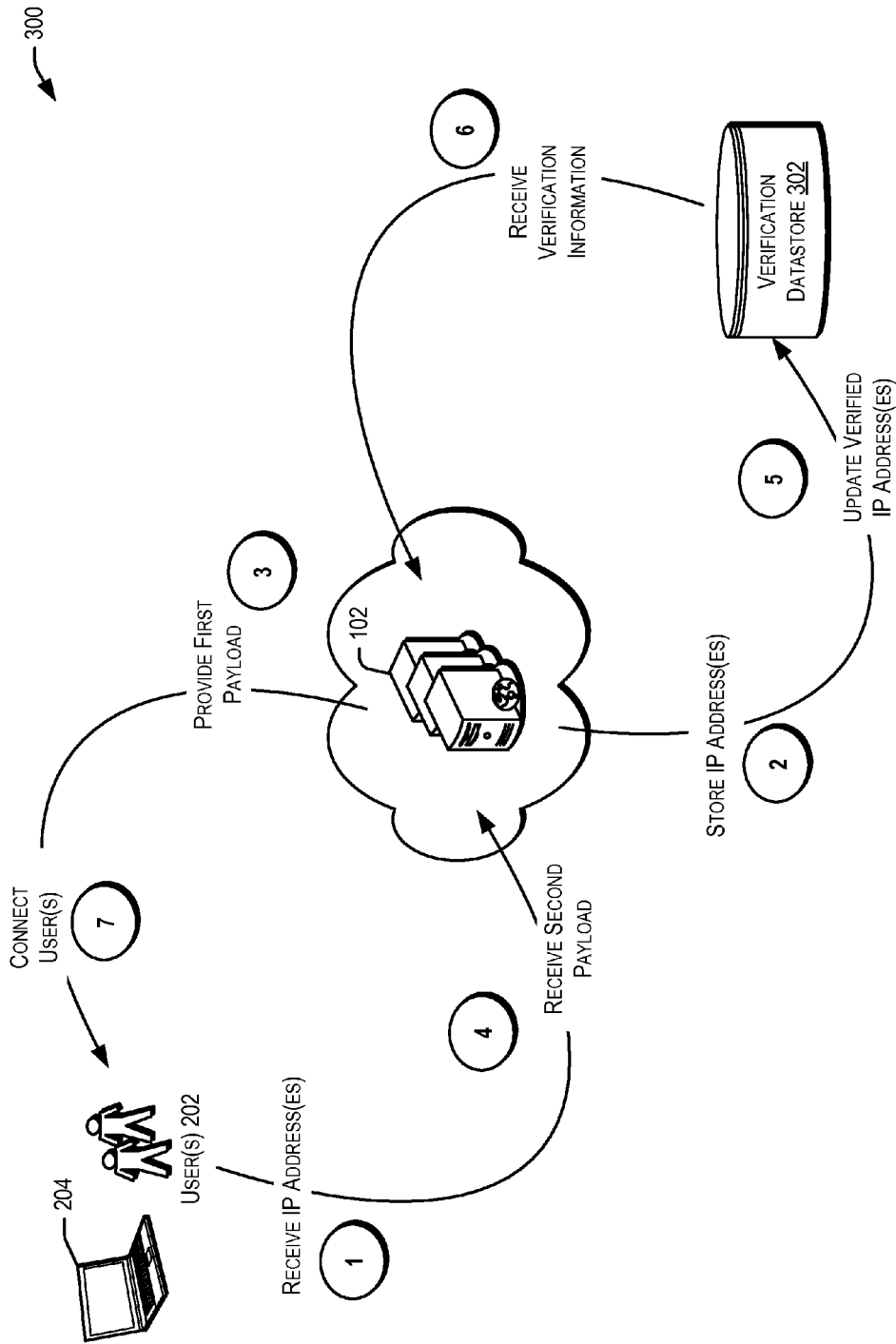
FIG. 3 illustrates an example flow of some additional features of the network address verification, according to at least one example.

FIG. 3 illustrates another example flow diagram showing one or more techniques 300 for verifying network addresses, as described herein. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, the one or more service provider computers 102 described above with respect to FIGS. 1 and 2 may receive IP addresses from users 202 utilizing one or more user devices 204, as seen in FIG. 2. Theses IP addresses may, in some examples, be stored in a data store 302 such as the verification data store 112 described in FIG. 1. In some aspects, the service provider computers 102 may then provide a first payload to the computing devices 204 identified by the received and stored IP addresses. As noted briefly above, in some examples, the payload may include metadata such as, but not limited to, sequence numbers (e.g., to aggregate multiple packets or the like), associated account numbers, associated user names, state information, algorithms, etc. Additionally, in some examples, the packets may be provided in an Internet Control Message Protocol (ICMP) message (i.e., a ping), a User Datagram Packet (UDP) message, or a Transmission Control Packet (TCP) message. The user devices 204 may include software or filters configured to listen for the pings, read and/or unload the packets, and potentially perform transformation on the data (e g, running a hash function on the data).

In some examples, as noted above, distributed state tracking methods may be employed to enable efficient and/or less complex ways of verifying IP address ownership. For example, the metadata or the packet sent (i.e., some or more of the payload) may include an algorithm for choosing the data in the packet to be utilized for verification. In other words, the packet may include more data than is needed for verification, and the algorithm may be configured to identify the data of the packet to be utilized. For example, the algorithm may instruct the user device 204 to concatenate several portions of the payload (e.g., the destination IP, the date, the customer identifier (ID), etc.) and/or perform method authentication (e.g., a hash-based message authentication code (HMAC) or the like) or other authentication methods to the payload. The service provider computers 102 may also perform this algorithm on the first data payload prior to sending it. In this way, the service provider computers 102 may not need to record the provided payload. When the user device 204 provides the second payload to verify ownership the tested IP address, the service provider computers 102 may be configured to look up the customer ID, the IP address, and/or the date, recreate the whole string (based at least in part on the algorithm), perform the HMAC authentication and compare the payloads without storing a database of all the verification payloads that have been sent. In some aspects, the state information of the metadata may be utilized to prove the IP address ownership based at least in part on the above methods or on other authentication methods that rely on the state of the payloads being shared.

In some aspects, the service provider computers 102 may receive a second payload from the user computers 204. The second payload may be a retransmission of the first payload. However, the second payload may also be a transformed or altered version (or a portion) of the first payload. While not shown explicitly in FIG. 3, the service provider computers 102 may then verify ownership of the IP address by the customer, account, and/or computing device. In some cases, this may be done by comparing the second payload with the first payload. Additionally, this may be done by comparing the second payload with a transformation of the first payload. The service provider computers 102 may then update the verification data store 302 based at least in part on the verification. Prior to making a connection to any of the IP addresses in the data store 302, the service provider computers 102 may perform a table lookup (or other data recall operation) to determine whether the IP address in question has been verified. As such, the service provider computers 102 may receive such verification information from the data store 302. Further, the service provider computers 102 may then connect with user computers 204 based at least in part on the received verification information. Otherwise, an IP address may be black listed or otherwise indicated (e.g., in a table of the data store 302) as not be verified or belonging to a malicious entity.

Figure 4:
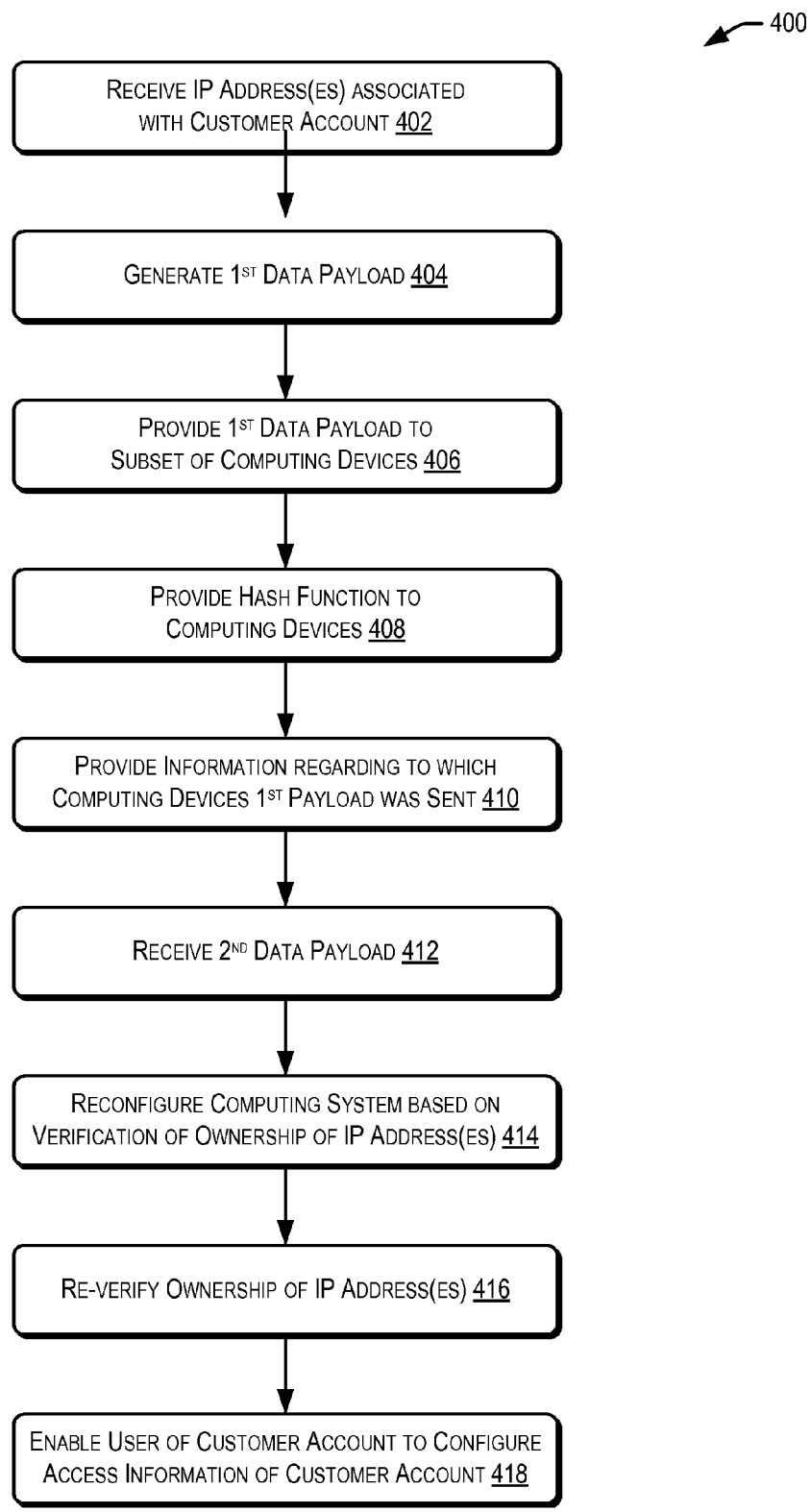
FIG. 4 illustrates an example flow diagram of a process for implementing the network address verification described herein, according to at least one example.
Figure 5:
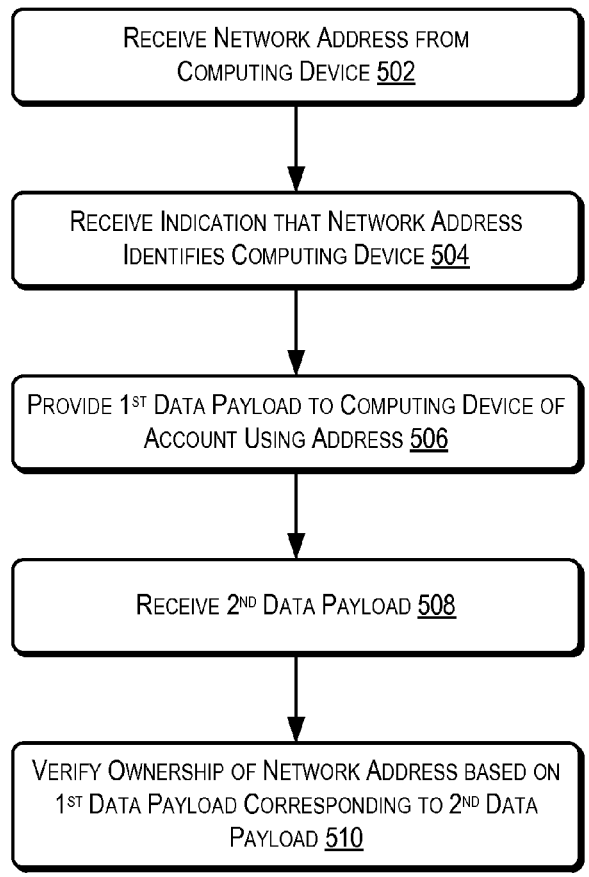
FIG. 5 illustrates an example flow diagram of a process for implementing the network address verification described herein, according to at least one example.
Figure 6:
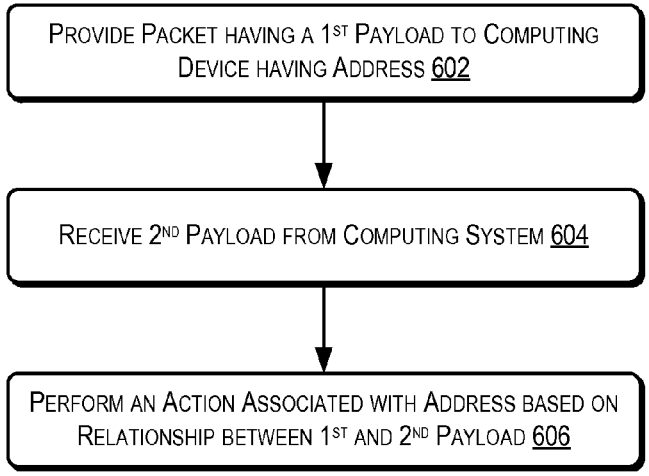
FIG. 6 illustrates an example flow diagram of a process for implementing the network address verification described herein, according to at least one example.

FIGS. 4-6 illustrate example flow diagrams showing respective processes 400-600 for verifying network addresses. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 102 (e.g., utilizing at least one of the association module 236, the payload module 238, the transformation module 240, and/or the verification module 242) shown in FIG. 2 may perform the process 400 of FIG. 4. The process 400 may begin by including receiving IP addresses associated with a customer account at 402. The IP addresses may each identify one or more computing devices that mange the customer account and/or that operate within a private network of the customer account. At 404, the process 400 may include generating a first data payload. The first data payload may include metadata (e.g., a sequence number, a name associated with the customer account, or the like). The process 400 may also include providing the first data payload to a subset of the computing devices at 406. In some examples, the payload is provided to computing devices identified by the IP addresses received at 402. In some aspects, at 408, the process 400 may include providing a hash or other cryptographic algorithm to the computing devices that received the first payload. This way, if the payload is to be transformed, the computing device will have the appropriate transformation algorithm.

At 410, the process 400 may include providing information regarding to which computing devices the first payload was sent. In some aspects, this will enable the computers of the customer account to know in advance which endpoints or connections to listen on. For example, if ten IP address were received from a single customer, yet payloads were only being sent to three of those ten, the devices identified by the three IP addresses selected can be informed. This way, all ten customer devices will not be unnecessarily listening or filtering for data. In some examples, the process 400 may also include receiving a second data payload at 412. As noted above, the second data payload may be a retransmission of the first data payload (for comparison) or it may be a transformation of the first data payload. At 414, the process 400 may include reconfiguring a computing system based at least in part on verification of ownership of the IP addresses and/or based at least in part on the first payload matching the second payload. In some examples, reconfiguring the computing system may include marking a lookup table (e.g., to identify a verified IP address or ownership) or otherwise indicating which IP address-owner pairs have been verified. The process 400 may also include re-verifying the ownership of IP addresses after an amount of time or after a trigger point is reached at 416. The process 400 may end at 418, where the process 400 may include enabling a user of the customer account (e.g., an administrator of an enterprise solution, or the like) to configure access information (e.g., user identifiers, passwords, etc.) of the customer account once the IP address has been verified.

FIG. 5 illustrates an example flow diagram showing process 500 for verifying network addresses. The one or more service provider computers 102 (e.g., utilizing at least one of the association module 236, the payload module 238, the transformation module 240, and/or the verification module 242) shown in FIG. 2 may perform the process 500 of FIG. 5. The process 500 may begin by including receipt of a network address from a computing device at 502. The network address may include an IP address or some other address-identifying indicator (e.g., a router name, a host endpoint, etc.). At 504, the process 500 may include receiving an indication that the received network address identifies the computing device. This indication may be received from the computing device claiming to be identified by the IP address. Additionally, at 506, the process 500 may include providing a first data payload to the computing of the account that utilizes the received address. At 508, the process 500 may include receiving the second data payload from the client. Further, the process 500 may end at 510 by including verifying ownership of the network address based at least in part on the first data payload corresponding to the second payload. In some examples, the first data payload may correspond to the second payload when the two payloads match. However, in other examples, they correspond to one another when one of the payloads was derived from the other.

FIG. 6 illustrates an example flow diagram showing process 600 for verifying network addresses. The one or more service provider computers 102 (e.g., utilizing at least one of the association module 236, the payload module 238, the transformation module 240, and/or the verification module 242) shown in FIG. 2 may perform the process 600 of FIG. 6. The process 600 may begin by including providing a first payload to a computing device having an address. In at least one example, the process 600 may also include receiving a second payload from the computing device at 604. At 606, the process 600 may end by including performing an action associated with the address and based at least in part on a relationship between the first payload and the second payload.

Illustrative methods and systems for verifying network addresses are described above. Some or all of these systems and methods may, but need not, be implemented at least partially by architectures such as those shown at least in FIGS. 1-6 above.

Figure 7:
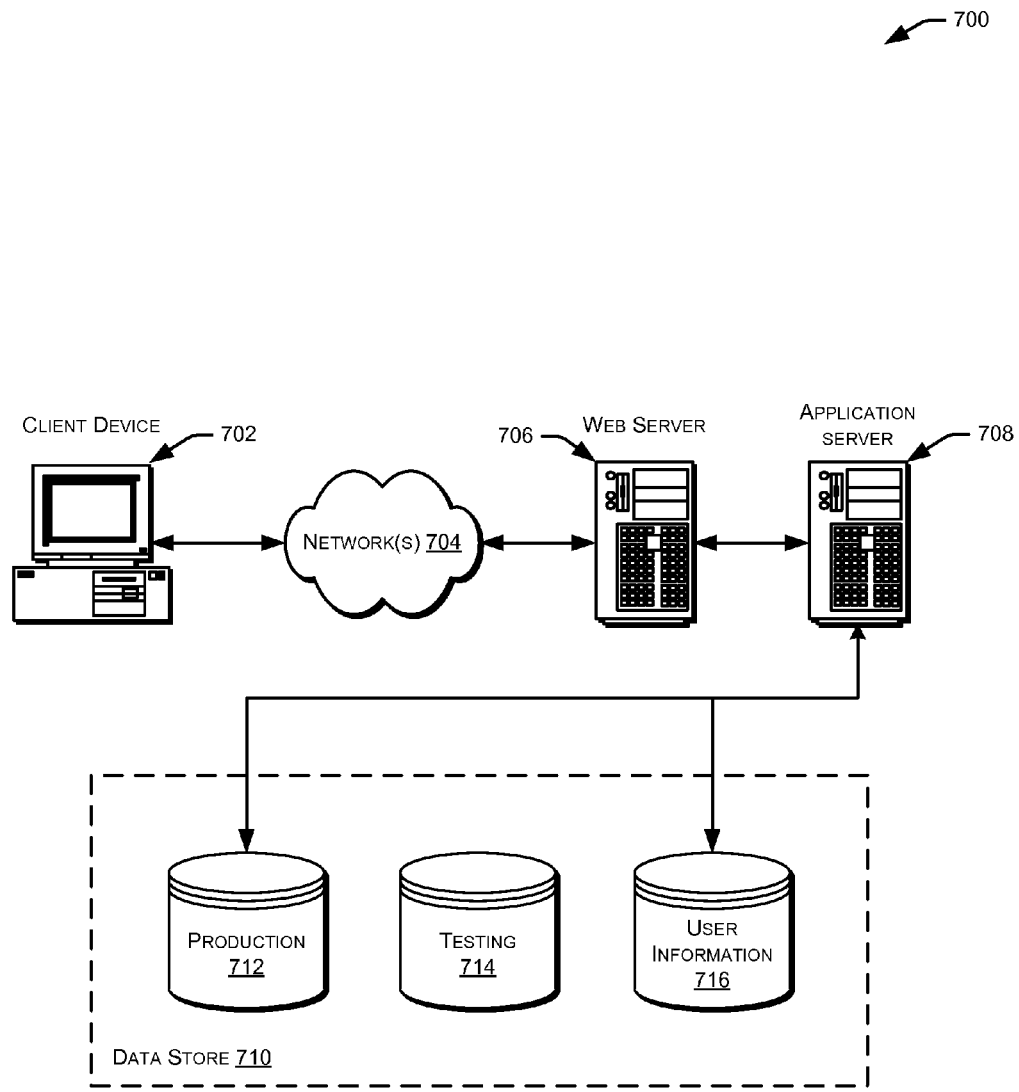
FIG. 7 illustrates an environment in which various embodiments of the network address verification described herein can be implemented, according to at least one example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for verifying an address of a computing device, comprising:
    receiving, by one or more computer systems, one or more Internet Protocol addresses associated with a customer account, each Internet Protocol address identifying a respective computing device of a plurality of computing devices associated with the customer account;
    generating, by the one or more computer systems, a first data payload;
    providing the first data payload to at least a subset of each respective computing device by sending a packet with the first data payload addressed to the Internet Protocol address associated with each respective computing device of the subset;
    receiving, in response to the first data payload being provided to at least one of the plurality of computing devices, a second data payload from the at least one of the plurality of computing devices;
    verifying, by the one or more computer systems, ownership of at least one Internet Protocol address of the one or more Internet Protocol addresses based at least in part on the first data payload corresponding to the second data payload; and
    reconfiguring a computing system to associate ownership of the at least one Internet Protocol address with the customer account based at least in part on the verified ownership.

2. The computer-implemented method of claim 1, wherein the first data payload corresponds to the second data payload when the second data payload matches a hash of the first data payload.

3. The computer-implemented method of claim 2, further comprising indicating a hash function to be utilized by the respective computing device to enable generation of the hash of the first data payload.

4. The computer-implemented method of claim 1, further comprising providing information regarding to which respective computing devices the first data payload is provided.

5. The computer-implemented method of claim 1, wherein each respective computing device of the subset is provided a different first data payload.

6. The computer-implemented method of claim 1, wherein providing the first data payload includes causing a third party computing device to send the first data payload to at least the subset of each respective computing device or transmitting, from the one or more computer systems located at a plurality of different geographic locations, the first data payload to at least the subset of each respective computing device.

7. The computer-implemented method of claim 1, further comprising re-verifying, after a period of time, ownership of a verified Internet Protocol address based at least in part on a new provided data payload matching a new received data payload.

8. The computer-implemented method of claim 1, further comprising enabling a user of the customer account that has been verified as an owner of at least one of the one or more Internet Protocol addresses to configure access information associated with the customer account.

9. A computer-implemented method for verifying an address of a computing device, comprising:
    providing, by one or more computer systems, a first data payload to a computing device of an account corresponding to a customer by sending a packet with the first data payload addressed to a network address received from the computing device of the account corresponding to the customer, an address of the computing device identified by the network address;
    receiving, in response to the first data payload being provided to the computing device, a second data payload from the computing device; and
    verifying, by the one or more computer systems, ownership of the network address with relation to the account corresponding to the customer based at least in part on the first data payload corresponding to the second data payload.

10. The computer-implemented method of claim 9, wherein the network address includes at least an Internet Protocol version 4 or version 6 address.

11. The computer-implemented method of claim 9, further comprising receiving, from the computing device, an indication that the network address identifies the computing device.

12. The computer-implemented method of claim 9, wherein the first data payload includes information to which the computing device lacks access until receipt of the first data payload.

13. The computer-implemented method of claim 12, wherein the first data payload is provided as an Internet Control Message Protocol message, a User Datagram Protocol message, or a Transmission Control Protocol message.

14. The computer-implemented method of claim 9, wherein the second data payload includes a hash value generated to form a cryptographic hash of the first data payload.

15. A system for verifying an address of a computing device, comprising:
   at least one memory that stores computer-executable instructions; and
   at least one processor configured to access the at least one memory, wherein the at least one processor is configured to execute the computer-executable instructions to collectively at least:
      manage a set of network addresses associated with a computing device that provided the network address, the computing device corresponding to an account of a customer;
      transmit a payload to the computing device of the account by sending the payload to at least one of the set of network addresses, the at least one of the set of network addresses identifying the computing device corresponding to the customer;
      in response to transmitting the payload to the computing device, receive, from the customer, proof that the computing device received the payload at the network address; and
      indicate an ownership association between the at least one of the set of network addresses with relation to the associated computing device based at least in part on the received proof.

16. The system of claim 15, further comprising generating each payload independently.

17. The system of claim 15, wherein the payload is associated with at least metadata corresponding to at least one of the network address, the computing device, the account, the customer, or the payload, the metadata being necessary for enabling the computing device to indicate the proof.

18. The system of claim 17, wherein the metadata includes a sequence number associated with the payload.

19. The system of claim 17, wherein the metadata includes an identifier associated with the computing device, the account, or the customer.

20. The system of claim 17, wherein the payload is associated with at least the metadata by including at least the metadata.

21. The system of claim 17, wherein the payload is associated with at least the metadata by deriving a value for the metadata based at least in part on the payload.

22. The system of claim 17, wherein the metadata includes state information for determining when the received proof indicates ownership of the network address by the associated computing device.

23. The system of claim 22, wherein the received proof includes a second payload that corresponds to the provided payload.

24. One or more computer-readable media storing computer-executable instructions for verifying an address of a computing device that, when executed by one or more computer systems, configure the one or more computer systems to:
   provide a packet having a first payload to an address associated with a computing device;
   receive, in response to providing the packet having the first payload, a second payload from the computing device;
   verify ownership of the address by comparing the first payload to the second payload; and
   perform an action associated with the address based at least in part the verified ownership.

25. The one or more computer-readable media of claim 24, wherein the address is an Internet Protocol version 4 address of the computing device or an Internet Protocol version 6 address of the computing device.

26. The one or more computer-readable media of claim 24, wherein the instructions further configure the one or more computer systems to generate information to be included in the first payload, wherein the computing device lacks access to the information until receipt of the first payload.

27. The one or more computer-readable media of claim 24, wherein the information includes a randomly generated number.

28. The one or more computer-readable media of claim 24, wherein the relationship includes at least the first payload matching the second payload.

29. The one or more computer-readable media of claim 28, wherein the action includes at least validating a correspondence between the first payload and the second payload.

30. The one or more computer-readable media of claim 29, wherein the action further includes associating the address with the computing device.

* * * * *